US010985906B2

(12) United States Patent
Cai et al.

(10) Patent No.: US 10,985,906 B2
(45) Date of Patent: *Apr. 20, 2021

(54) METHOD AND SYSTEM FOR SECURE ENCRYPTION

(71) Applicant: Macau University of Science and Technology, Macau (CN)

(72) Inventors: Zhanchuan Cai, Macau (CN); Ting Lan, Macau (CN)

(73) Assignee: Macau University of Science and Technology, Macau (CN)

( * ) Notice: Subject to any disclaimer, the term of this patent is extended or adjusted under 35 U.S.C. 154(b) by 517 days.

This patent is subject to a terminal disclaimer.

(21) Appl. No.: 15/880,566

(22) Filed: Jan. 26, 2018

(65) Prior Publication Data

US 2019/0238314 A1 Aug. 1, 2019

(51) Int. Cl.
*H04L 9/06* (2006.01)
*H04L 29/06* (2006.01)
*G06F 21/60* (2013.01)
*G06F 7/49* (2006.01)

(52) U.S. Cl.
CPC ............ *H04L 9/0625* (2013.01); *G06F 7/49* (2013.01); *G06F 21/602* (2013.01); *H04L 63/0428* (2013.01)

(58) Field of Classification Search
CPC .......... G06F 7/49; G06F 7/483; G06F 21/602; G06F 21/60; H04L 9/0625; H04L 63/0428
See application file for complete search history.

(56) References Cited

U.S. PATENT DOCUMENTS

| | | | | | |
|---|---|---|---|---|---|
| 3,652,840 | A | * | 3/1972 | Lanning | H03M 7/10 341/89 |
| 3,652,841 | A | * | 3/1972 | Lanning | H03M 7/10 341/89 |
| 5,197,024 | A | * | 3/1993 | Pickett | G06F 7/483 708/517 |
| 5,374,928 | A | * | 12/1994 | Moore | G06F 40/12 341/67 |
| 10,635,786 | B2 | * | 4/2020 | Cai | G06F 21/602 |
| 2017/0017467 | A1 | * | 1/2017 | Sexton | G06F 7/4873 |
| 2018/0041334 | A1 | * | 2/2018 | Revell | H04L 9/0618 |
| 2018/0270054 | A1 | * | 9/2018 | Cai | G06F 21/602 |

OTHER PUBLICATIONS

G. S. White, "Coded decimal number systems for digital computers," Proceedings of the IRE, vol. 41, No. 10, pp. 1450-1452, 1953.

(Continued)

*Primary Examiner* — Tae K Kim
(74) *Attorney, Agent, or Firm* — Eagle IP Limited; Jacqueline C. Lui (57) ABSTRACT

A method executed by a computer system that transmits a multimedia content through a negative-base number. The method includes generating a binary sequence for the multimedia content, converting the binary sequence into a negative-base number, receiving the negative-base number, retrieving a negative base of the negative base number, calculating the binary sequence based on the negative-base number and the negative base, and obtaining the multimedia content based on the binary sequence.

14 Claims, 10 Drawing Sheets

(56) References Cited

OTHER PUBLICATIONS

C. Van De Woestijne, "Noncanonical number systems in the integers," Journal of Number Theory, vol. 128, No. 11, pp. 2914-2938, 2008.
A. Barbé, & F. von Haeseler, "Binary number systems for Zk," Journal of Number Theory, vol. 117, No. 1, pp. 14-30, 2006.
S. Akiyama, "Positive finiteness of number systems," Number theory, vol. 15, pp. 1-10, 2006.
D. W. Matula, "Basic digit sets for radix representation," Journal of the ACM (JACM), vol. 29, No. 4, pp. 1131-1143, 1982.
G. Bergman, "A number system with an irrational base," Mathematics Magazine, vol. 31, No. 2, pp. 98-110, 1957.
V. S. Dimitrov, & G. A. Jullien, "A new number representation with applications," IEEE Circuits and Systems Magazine, vol. 3, No. 2, pp. 6-23, 2003.
A. R. Plantz, & M. Berman, "Adoption of the octal number system," IEEE Transactions on Computers, vol. 100, No. 5, pp. 593-598, 1971.
X. Huang, "Analysis of Chinese Characters Coding Process," Computer Knowledge and Technology, vol. 4, No. 11, pp. 181-182, 2015.
"American Standard Code for Information Interchange," ASA X3.4-1963, American Standards Association, Jun. 17, 1963.

\* cited by examiner

| Decimal | Negative Base | Decimal | Negative Base |
|---|---|---|---|
| $a = 10$ | $b = -2$ | $a = 10$ | $b = -2$ |
| 1 | 1 | -1 | 11 |
| 2 | 110 | -2 | 10 |
| 3 | 111 | -3 | 1101 |
| 4 | 100 | -4 | 1100 |
| 5 | 101 | -5 | 1111 |
| 6 | 11010 | -6 | 1110 |
| 7 | 11011 | -7 | 1001 |
| 8 | 11000 | -8 | 1000 |
| 9 | 11001 | -9 | 1011 |
| 10 | 11110 | -10 | 1010 |
| 11 | 11111 | -11 | 110101 |
| 12 | 11100 | -12 | 110100 |
| 13 | 11101 | -13 | 110111 |
| 14 | 10010 | -14 | 110110 |
| 15 | 10011 | -15 | 110001 |
| ... | ... | ... | ... |

| Decimal $a = 10$ | Negative Base $b = -8$ | Decimal $a = 10$ | Negative Base $b = -8$ |
|---|---|---|---|
| 1 | 1 | -1 | 17 |
| 2 | 2 | -2 | 16 |
| 3 | 3 | -3 | 15 |
| 4 | 4 | -4 | 14 |
| 5 | 5 | -5 | 13 |
| 6 | 6 | -6 | 12 |
| 7 | 7 | -7 | 11 |
| 8 | 170 | -8 | 10 |
| 9 | 171 | -9 | 27 |
| 10 | 172 | -10 | 26 |
| 11 | 173 | -11 | 25 |
| 12 | 174 | -12 | 24 |
| 13 | 175 | -13 | 23 |
| 14 | 176 | -14 | 22 |
| 15 | 177 | -15 | 21 |
| ... | ... | ... | ... |

Algorithm 1 The decimal number to the negative base number

1: $M$ is the decimal number
2: $b$ is the negative base
3: result[]
4: for $k=0$ until $q=0$ do
5:     Function conversion ( )
6:     if $abs(b) > 1$ and $M \neq 0$ then
7:         $q = M/b$
8:         $p = M - i \times b$
9:         if $p < 0$ and $b < 0$ then
10:             $p = p + abs(b)$
11:             $q++$
12:         end if
13:         result$[k] = p$
14:     end if
15:     end Function
16:     if $q \neq 0$ then
17:         $M = q$
18:         $k++$
19:         Function conversion ($M$)
20:     end if
21: end for

METHOD AND SYSTEM FOR SECURE ENCRYPTION

FIELD OF THE INVENTION

The present invention relates to information security, and more particularly to methods and systems that improve security of private information transmission.

BACKGROUND

Multimedia information or multimedia contents transmit through networks to deliver text, images, audio or video data to the receiving terminal. Private information or confidential data is often encrypted to avoid unauthorized access, use, disclosure, modification, or recording. Hence, a need exists to prevent external intrusions and improve information security.

New methods and systems that assist in advancing technological needs and industrial applications in the field of information security are desired.

SUMMARY OF THE INVENTION

One example embodiment is a method executed by a computer system that transmits a multimedia content through a negative-base number. The method includes generating a binary sequence for the multimedia content, converting the binary sequence into a negative-base number, receiving the negative-base number, retrieving a negative base of the negative base number, calculating the binary sequence based on the negative-base number and the negative base, and obtaining the multimedia content based on the binary sequence.

Other example embodiments are discussed herein.

DETAILED DESCRIPTION

Example embodiments relate to methods and systems that improve security of private information transmission.

Multimedia contents, such as text, images, audio or video data, are transmitted in codes. The codes represent complex and diverse information and have various forms such as symbols combined in certain ways. Digital coding converts continuous signals to discrete sample information, and the discrete sample information is converted to binary codes to be recognized by computers.

Many security technologies have been developed to encrypt multimedia information or multimedia contents that are transmitted over networks. Existing or conventional schemes or algorithms, such as Data Encryption Standard (DES) scheme, cannot generate a key derived from a relationship between one multimedia information with another one because the relationship is difficult to be determined by using conventional schemes.

Example embodiments solve the problems and protect multimedia information from unauthorized access by transmitting the multimedia content through a negative-base number and by generating a key to encrypt the private information. The key is derived from the relationship between two multimedia contents and is used to encrypt any of the two multimedia contents.

Consider an example in which a computer system transmits a private text from a sender to a receiver of the computer system. The computer system includes a binary generator, a negative base generator, an encryptor, and a decoder. The binary generator converts a binary image and the private text into binary sequences, respectively. The negative base generator converts the binary sequences into decimal numbers with a base of 10, and further converts the decimal numbers to negative-base numbers with a base of −2 or −10. The encryptor derives or determines a key from the relationship between the negative-base number of the binary image and the negative-base number the private text. The sender sends the key and the negative-base number of the binary image to the receiver of the computer system. The decoder communicates with the receiver and obtains the negative-base number of the private text based on the key. The decoder further calculates the binary sequence of the private text and obtains the private text.

In one example embodiment, the key is predetermined by the encryptor of the computer system by a geometric operation between the binary image and the private text. The geometric operation is, but not limited to addition, subtraction, multiplication, and division.

Figure 1:
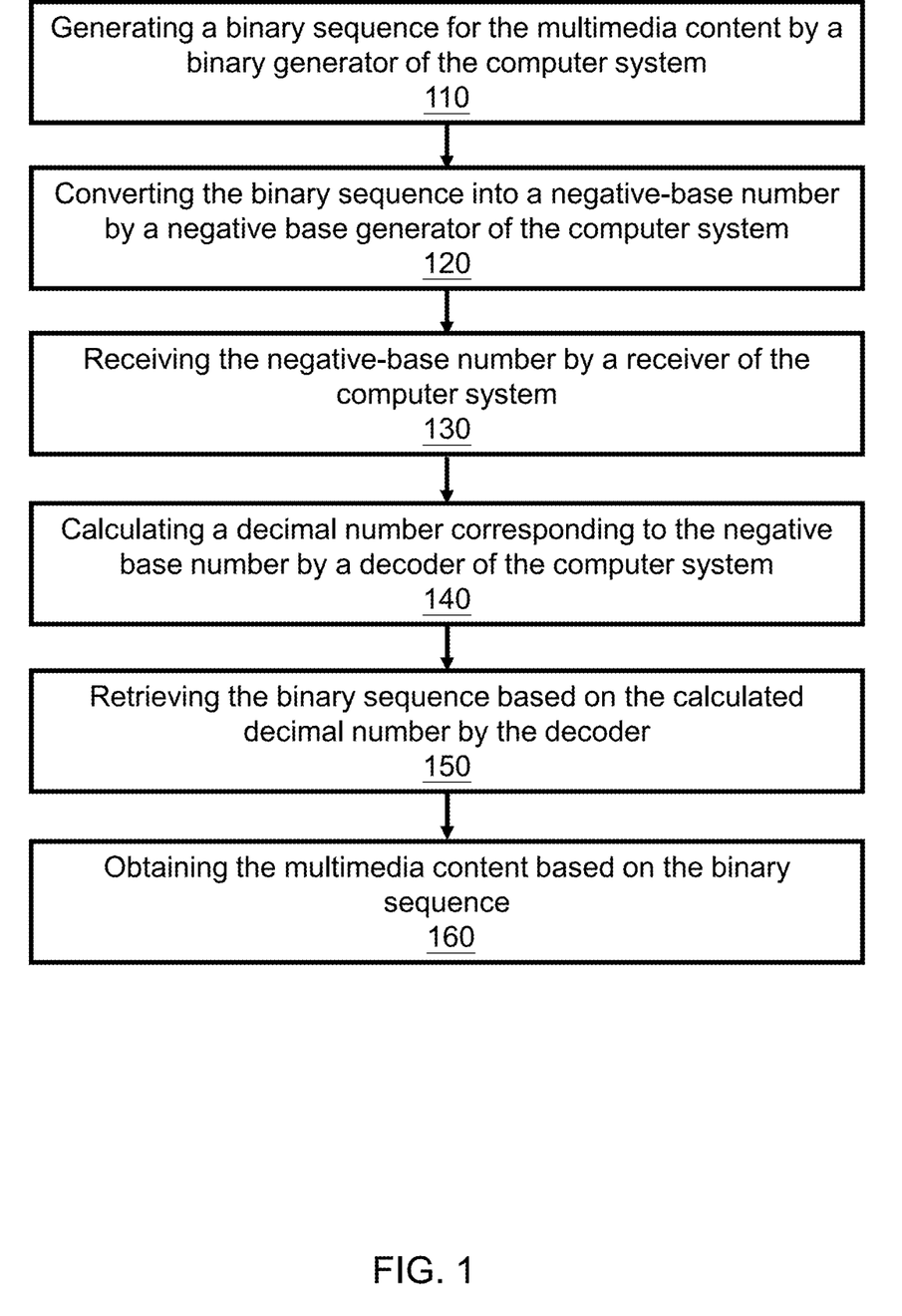
FIG. 1 shows a method executed by a computer system to transmit a multimedia content in accordance with an example embodiment.

FIG. 1 is a method executed by a computer system to transmit a multimedia content in accordance with an example embodiment.

Block 110 states generating a binary sequence for the multimedia content by a binary generator of the computer system.

Consider an example in which a computer system includes a binary generator, a negative base generator, a receiver, and a decoder. The computer system transmits a multimedia content to a receiver of the computer system. The binary generator divides the multimedia content into pieces and represents each piece by a bit. The multimedia content can be one or more Chinese characters, one or more English letters, and one or more images.

In one example embodiment, the multimedia content is a text. The text can be English words or Chinese characters. Three types of character codes for Chinese characters are used in computer, which are input code, NeiMa, and output code. Input code (Chinese characters outer code) contains a set of western keyboard symbols (letters, numbers and special symbols). NeiMa (Internal code) stores Chinese characters. Output code (character code) outputs Chinese characters. Binary codes of text information are converted to character codes. For example, the internal code of Chinese character '中' is 'D6D0', and the internal code of Chinese character '别' is 'BFC6'. The Internal code can be represented as a corresponding decimal number.

In one example embodiment, the text is represented by an American Standard Code for Information Interchange (ASCII). ASCII code convert 128 specified characters into eight-bit integers, and the highest bit (parity bit) is set to 0. For example, the ASCII code of letter 'Z' is '01011010', the ASCII code of number '0' is '00110000', and the ASCII code of symbol '?' is '00111111'. Each binary number corresponds to a decimal number.

The binary generator converts the ASCII code of the text into a decimal number with a base of 10, and then converts the decimal number into a binary sequence. By way of example, the ASCII code for '澳门特区' is 'B0C4 C3C5 CCD8 C7F8', which can be converted to a binary sequence of '1011000011000100110000111100010111001100110110001100011111111000'. As another example, the binary sequence for 'Macao SAR' is '01001101 01100001 01100011 01100001 01101111 00100000 01010011 01000001 01010010'.

In another example embodiment, the multimedia content is an image. The binary generator of the computer system divides the image into a matrix of pixels each corresponding to one or more bits in the binary sequence of the image.

Block 120 states converting the binary sequence into a negative-base number by a negative base generator of the computer system.

By way of example, positional notation is a method of representing numbers. It is based on the base and a set of digital symbols. Integer bases are commonly used for positional notation. A numeral system that uses 'a' different digits (0,1,2, ... a−1) is called a base 'a' numeral system. For example, in the decimal system, the base is 10, and ten different digits 0,1,2, ... , 9 are used in the decimal system. In computers, binary numeral system (base is 2) is widely used, with two binary digits, 0 and 1. Each digit has unique counting unit in the base 'a' numeral system. The position of a digit is used to signify the power of base 'a' that the digit is to be multiplied with, as in:

$$(e_n e_{n-1} \ldots e_1 e_0)_a = \sum_{k=0}^{n} e_k a^k \quad (1)$$

where the number $a^k$ represents the weights of the corresponding digits.

For the decimal system, every non-negative integer N has a unique decimal representation:

$$N = n_p \times 10^p + n_{p-1} \times 10^{p-1} + \ldots + n_1 \times 10^1 + n_0 \times 10^0 \quad (2)$$

where $n_k \in \{0,1,2, \ldots, 9\}$, $k=0,1,2, \ldots, p$.
Equation (2) can be simplified as:

$$N = (n_p n_{p-1} n_{p-2} \ldots n_1 n_0)_{10} \quad (3)$$

For the binary system, the arbitrary non-negative integer N has a general form as follows:

$$N = n_p \times 2^p + n_{p-1} \times 2^{p-1} + \ldots + n_1 \times 2^1 + n_0 \times 2^0 \quad (4)$$

where $n_k \in \{0,1\}$, $k=0,1,2, \ldots, p$.
Equation (4) can be simplified as:

$$N = (n_p n_{p-1} n_{p-2} \ldots n_1 n_0) \quad (5)$$

The arbitrary non-negative integer N can be represented with a non-negative integer 'a', as the base:

$$N = n_p \times a^p + n_{p-1} \times a^{p-1} + \ldots + n_1 \times a^1 + n_0 \times a^0 \quad (6)$$

where $n_k \in \{0,1,2, \ldots, a-1\}$, $k=0,1,2, \ldots, p$.

Non-integer bases can also be used to represent N, such as base 'τ' (tau) numeral system. Various base values in the positional number system are applied in various applications.

By way of example, a negative base can be used to construct a non-standard positional numeral system. Like other place-value systems, each position holds multiples of the appropriate power of the system's base. The negative base negator converts a number to a negative-base number. The negative base is indicated by '−a', a=2,3,4,5, . . . . A negative binary system includes negative-base number with a negative base of −2.

Gaussian integers 'N' based on a negative binary system can be represented as follows:

$$N = n_p \times (-2)^p + n_{p-1} \times (-2)^{p-1} + \ldots + n_1 \times (-2)^1 + n_0 \times (-2)^0 \quad (7)$$

where $n_k \in \{0,1\}$, $k=0,1,2, \ldots, p$.
Equation (7) can be simplified as:

$$N = (n_p n_{p-1} n_{p-2} \ldots n_1 n_0)_{(-2)} \quad (8)$$

Gaussian integers 'N' based on the negative decimal system can be represented as follows:

$$N = n_p \times (-10)^p + n_{p-1} \times (-10)^{p-1} + \ldots + n_1 \times (-10)^1 + n_0 \times (-10)^0 \quad (0)$$

where $n_k \in \{0,1,2, \ldots, 9\}$, $k=0,1,2, \ldots, p$.
Equation (9) can be simplified as:

$$N = (n_p n_{p-1} n_{p-2} \ldots n_1 n_0)_{(-10)} \quad (10)$$

When selecting negative integer (b<−1) as the base, integers (including negative integers) can be represented by |b| digits. For example, if b=−2, then 5 and −3 in decimal system are represented as follows:

$$5_{(10)} = 1 \times (-2)^2 + 0 \times (-2)^1 + 1 \times (-2)^0 = 101_{(-2)} - 3_{(10)} =$$
$$1 \times (-2)^3 + 1 \times (-2)^2 + 0 \times (-2)^1 + 1 \times (-2)^0 = 1101_{(-2)}$$

Conversion between binary systems, decimal systems and negative-base systems can be stored in a reference table.

By way of example, the negative base generator of the computer system converts the binary sequences into negative-base numbers. The negative base can be −2 or −10 or any other negative numbers. As one example, the binary sequence of '1011000011000100 1100001111000101 1100110011011000 1100011111111000' is converted to a negative-base number of '(193343681100584742036)$_{(-10)}$', in which the negative base is −10. As another example, the binary sequence of '01001101 01100001 01100011 01100001 01101111 00100000 01010011 01000001 01010010' is converted by the negative base generator to a negative-base number of '(1958862495465008163-0598)$_{(-10)}$'.

Block 130 states receiving the negative-base number by a receiver of the computer system.

Block 140 states calculating a decimal number corresponding to the negative base number by a decoder of the computer system.

By way of example, a negative-base number $n_p n_{p-1} n_{p-2} \ldots n_1 n_0$ is based on a negative base $b=-r$, $r=2,3,4,5,\ldots$. A decimal integer N can be written as:

$$N = \sum_{i=0}^{p} n_i (-r)^i \quad (11)$$

where each digit $n_i$ is a positive integer from 0 to r−1. When the negative-base number $n_p n_{p-1} n_{p-2} \ldots n_1 n_0$ and the value of the negative base b are known, the corresponding decimal number N can be calculated by the decoder of the computer system based on equation (11).

Block 150 states retrieving the binary sequence based on the calculated decimal number by the decoder.

By way of example, the decoder of the computer system stores a look-up table that stores the binary code for each decimal number. For example, the binary code for the decimal number 29410 is 1001001102.

Block 160 states obtaining the multimedia content based on the binary sequence.

By way of example, the decoder of the computer system stores a look-up table that stores the binary code for each ASCII code, and the text for each ASCII code. For example, the ASCII code for binary sequence '10110000110001001100001111000101 1100110011011000 1100011111111000' is 'B0C4 C3C5 CCD8 C7F8', and the text for the ASCII code is '澳門特区'.

Figure 2:
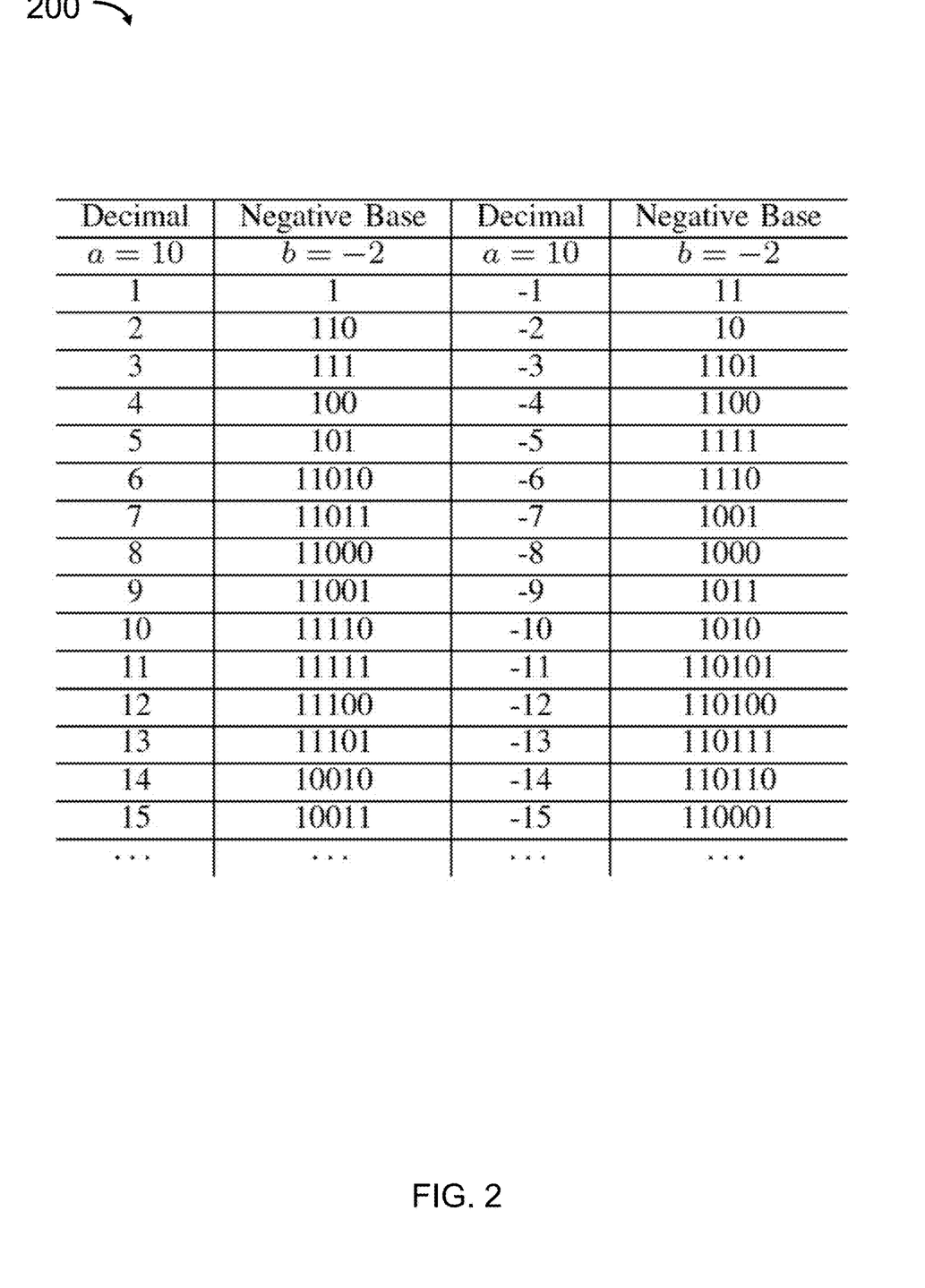
FIG. 2 shows a table of the positional number system in accordance with an example embodiment.

FIG. 2 shows a table 200 of the positional number system in accordance with an example embodiment.

Table 200 lists the relationship between decimal numbers and native-base numbers with a negative base of −2. Table 200 functions as a reference table for conversion between binary system, decimal system and negative-base system.

Figure 3:
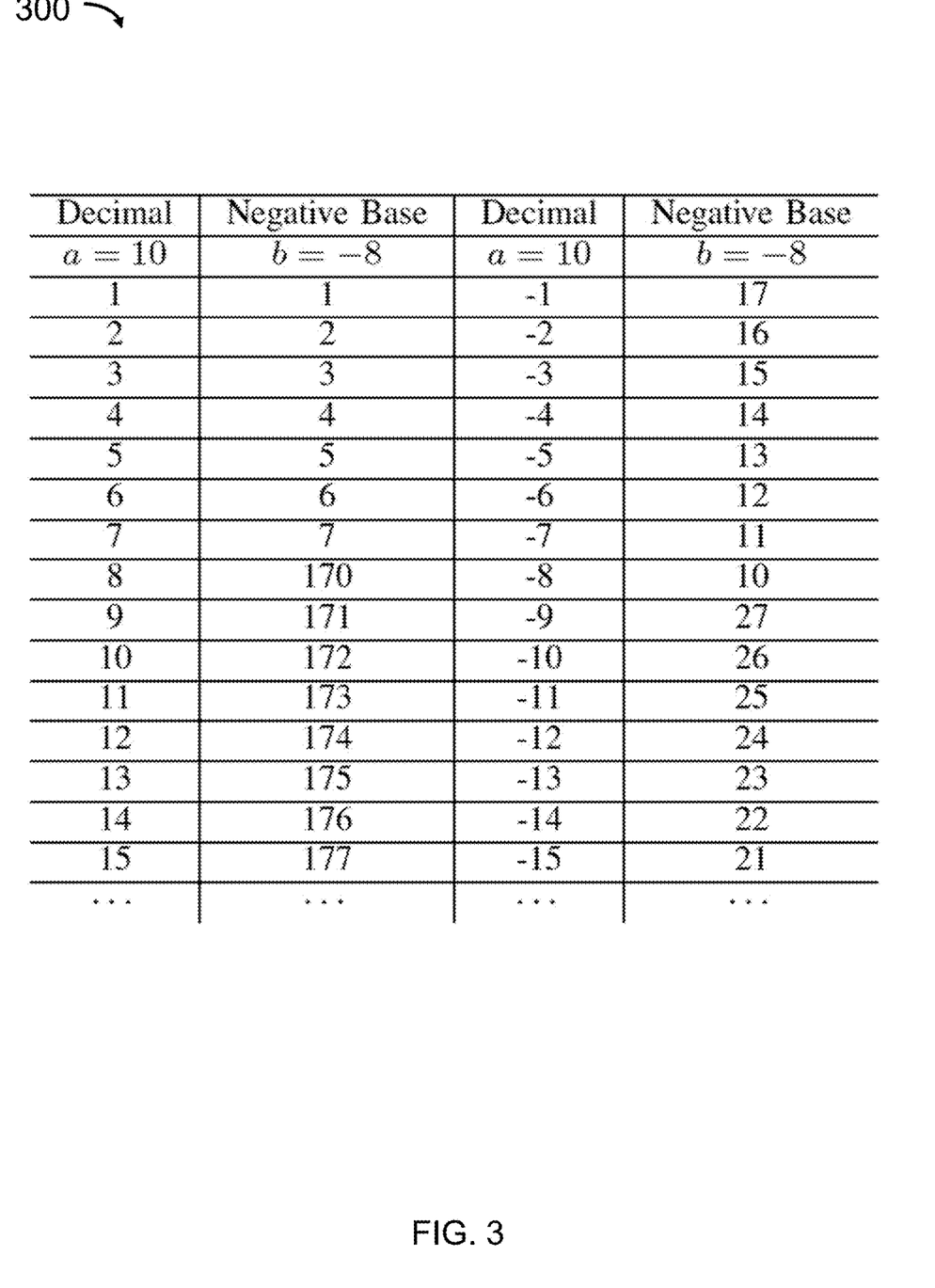
FIG. 3 shows a table of the positional number system in accordance with another example embodiment.

FIG. 3 shows a table 300 of the positional number system in accordance with another example embodiment.

Table 200 lists the relationship between decimal numbers and native-base numbers with a negative base of −2. Table 200 functions as a reference table for conversion between binary system, decimal system and negative-base system.

Figure 4:
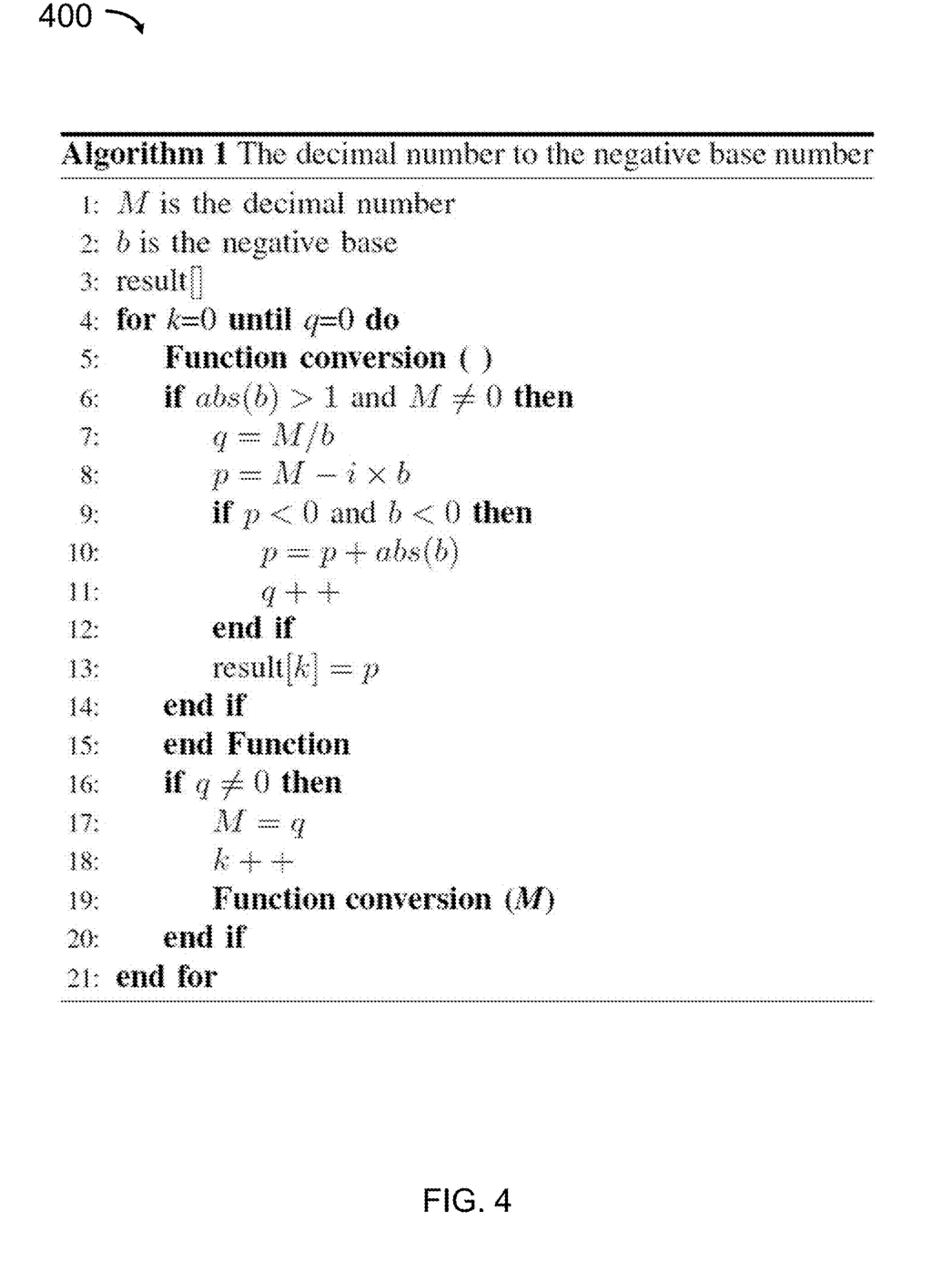
FIG. 4 shows an algorithm that converts decimal numbers to negative-base numbers in accordance with an example embodiment.

FIG. 4 shows an algorithm 400 that converts decimal numbers to negative-base numbers in accordance with an example embodiment.

By way of example, a negative base generator executes algorithm 400 to convert decimal number to negative-base numbers. Algorithm 400 shows an example process of converting a decimal number to a negative-base number. In the negative system notation, a decimal number 'M' is divided by 'b' for multiple times. Let the divisible quotient as a new dividend in each division step, the new dividend is divided by 'b' until the dividend is equal to 0. The remainder of each divisible step should be guaranteed between 0~−b−1. If b=−16, the remainder should be in a range of 0 to 15. Writing down each remainder, all the remainders are arranged from back to front, leading to the negative system notation representation of the original decimal number 'M'.

In one example embodiment, the process of converting decimal number −15 to a negative base number with a base b of −2 is shown as follows:

| −15 | −2 | | |
|---|---|---|---|
| 8 | ...... | The remainder is 1 | Because −15 − 8 × (−2) = 1 |
| −4 | ...... | The remainder is 0 | Because 8 − (−4) × (−2) = 0 |
| 2 | ...... | The remainder is 0 | |
| −1 | ...... | The remainder is 0 | |
| 1 | ...... | The remainder is 1 | |
| 0 | ...... | The remainder is 1 | Over |

Hence, decimal number '−15' (the decimal system) is equal to '110001' (the negative base 'b=−2' system).

In one example embodiment, the process of converting decimal number −15 to a negative base number with a base b of −8 is shown as follows:

| −15 | −8 | | |
|---|---|---|---|
| 2 | ...... | The remainder is 1 | Because −15 − 2 × (−8) = 1 |
| 0 | ...... | The remainder is 2 | Over |

Hence, '−15' (the decimal system) is equal to '21' (the negative base 'b=−8' system).

In one example embodiment, the process of converting decimal number 8 to a negative base number with a base b of −2 is shown as follows:

| 8 | −2 | | |
|---|---|---|---|
| −4 | ...... | The remainder is 0 | Because 8 − (−4) × (−2) = 0 |
| 2 | ...... | The remainder is 0 | Because (−4) − 2 × (−2) = 0 |
| −1 | ...... | The remainder is 0 | |
| 1 | ...... | The remainder is 1 | |
| 0 | ...... | The remainder is 1 | Over |

Hence, '8' (the decimal system) is equal to '11000' (the negative base 'b=−2' system).

In one example embodiment, the process of converting decimal number 8 to a negative base number with a base b of −8 is shown as follows:

| 8 | −8 | | |
|---|---|---|---|
| −1 | ...... | The remainder is 0 | Because 8 − (−1) × (−8) = 0 |
| 1 | ...... | The remainder is 7 | |
| 0 | ...... | The remainder is 1 | Over |

Hence, '8' (the decimal system) is equal to '170' (the negative base 'b=−8' system).

Figure 5A:
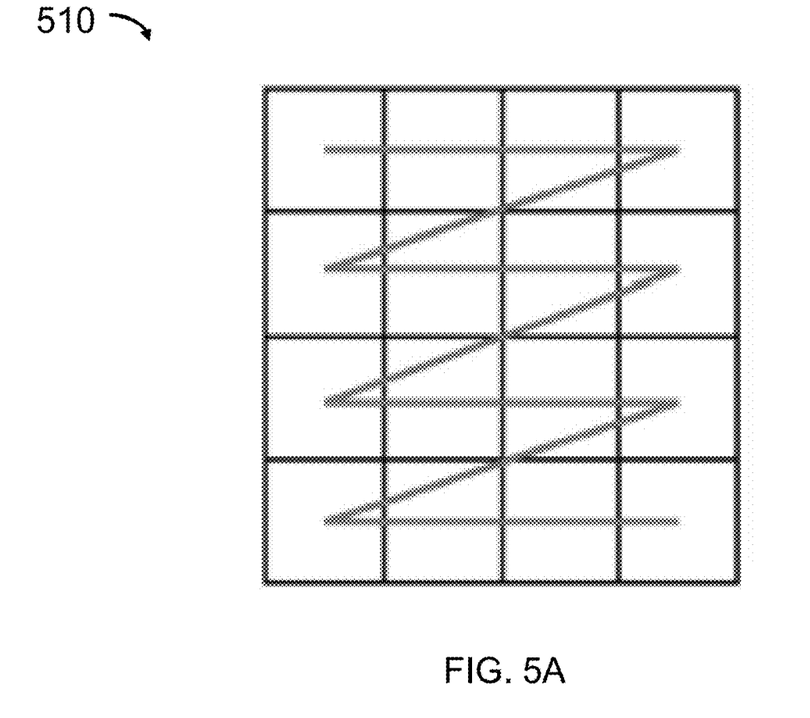
FIG. 5A shows a linearization scheme for an image in accordance with an example embodiment.

FIG. 5A shows a linearization scheme 510 for an image in accordance with an example embodiment.

Figure 5B:
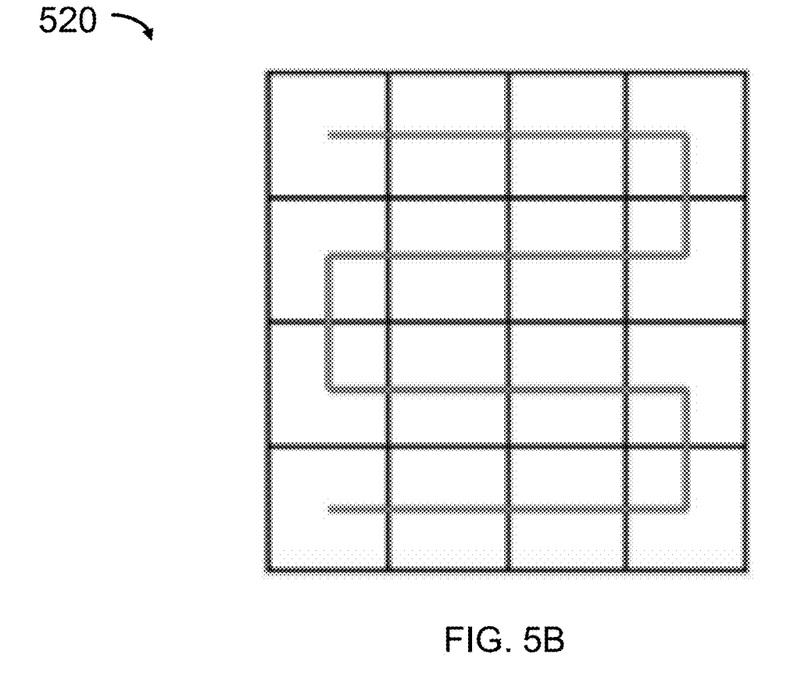
FIG. 5B shows a linearization scheme for an image in accordance with an example embodiment.

FIG. 5B shows a linearization scheme 520 for an image in accordance with an example embodiment.

Figure 5C:
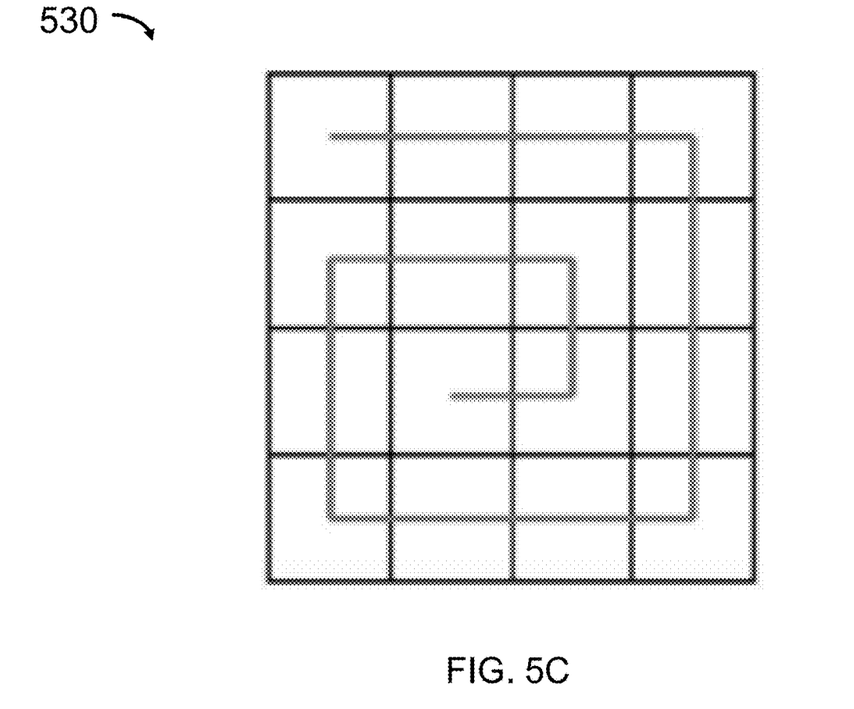
FIG. 5C shows a linearization scheme for an image in accordance with an example embodiment.

FIG. 5C shows a linearization scheme 530 for an image in accordance with an example embodiment.

Figure 5D:
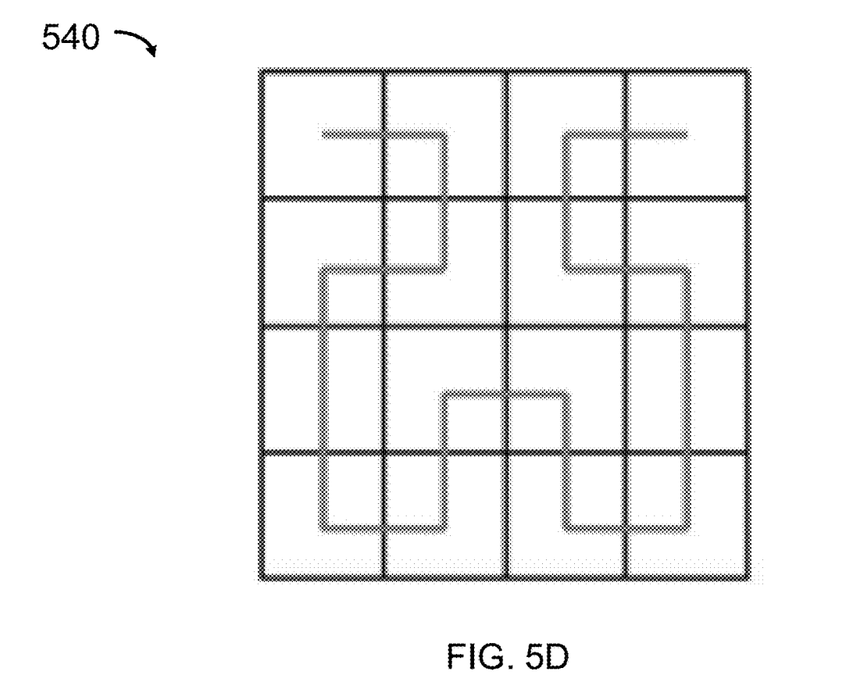
FIG. 5D shows a linearization scheme for an image in accordance with an example embodiment.

FIG. 5D shows a linearization scheme 540 for an image in accordance with an example embodiment.

Figure 5E:
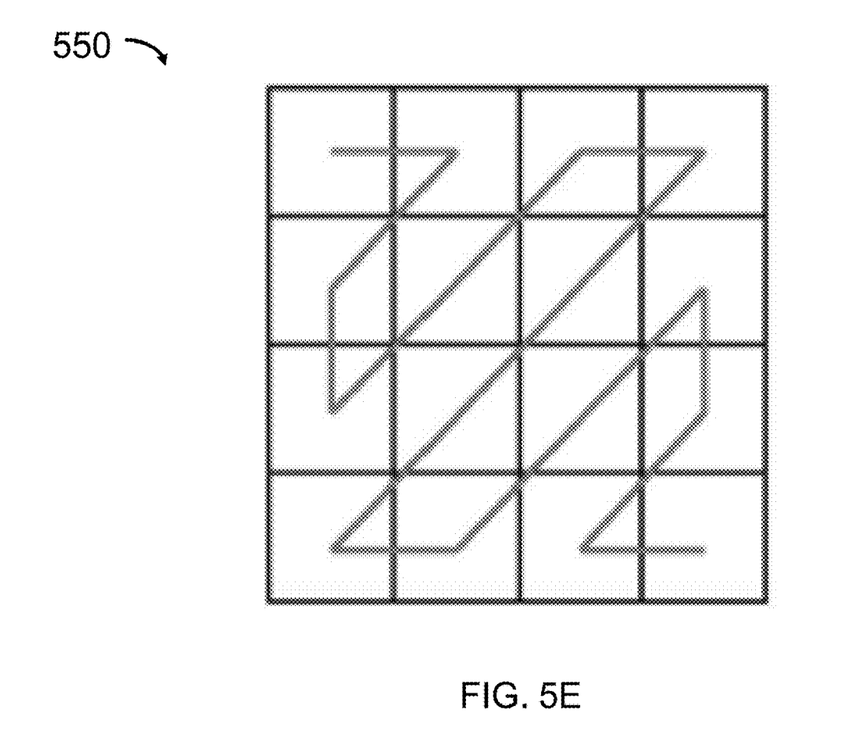
FIG. 5E shows a linearization scheme for an image in accordance with an example embodiment.

FIG. 5E shows a linearization scheme 550 for an image in accordance with an example embodiment.

Figure 5F:
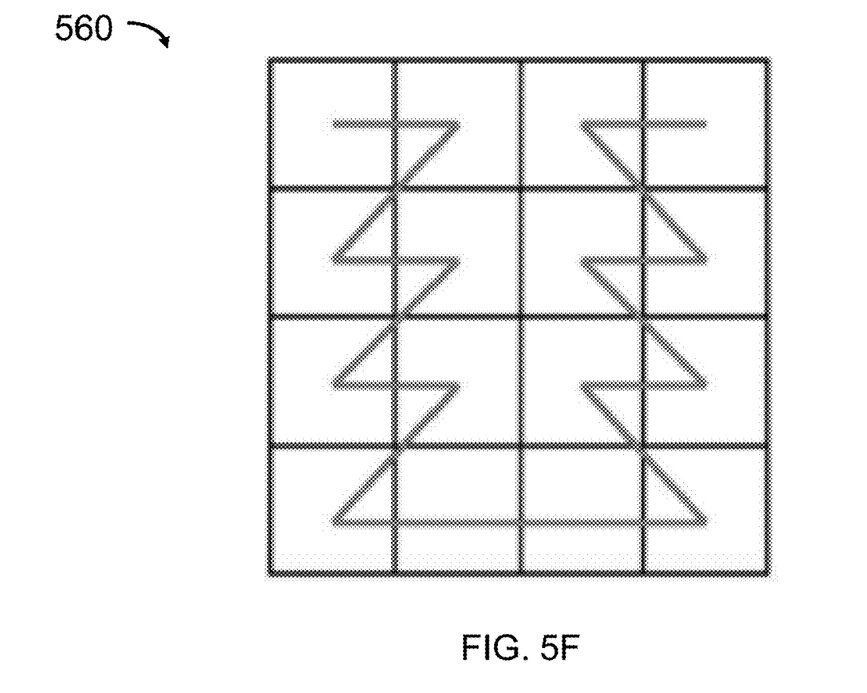
FIG. 5F shows a linearization scheme for an image in accordance with an example embodiment.

FIG. 5F shows a linearization scheme 560 for an image in accordance with an example embodiment.

By way of example, the multimedia information to be transmitted by the computer system is one or more images. As an example, in a two-dimensional space, a grey-scale image is divided into a plurality of blocks each corresponding to a pixel. The pixels form a two-dimensional (2D) matrix. The 2D matrix is linearized to obtain a linearized sequence in a one-dimensional space that is further converted into a binary sequence. FIG. 5A, FIG. 5B, FIG. 5C, FIG. 5D, FIG. 5E, and FIG. 5F show a number of linearization schemes 510, 520, 530, 540, 550, and 560, respectively. For each scheme, a linearized sequence is obtained by starting from the upper left and running along the broken line as shown across each pixel or pixel block.

In an example embodiment, the multimedia information is a color image. The color image is divided or partitioned into three components (e.g., Red (R), Green (G) and Blue (B)) by dimension-reduction treatment, and then each component is linearized such that three linearized sequences are obtained corresponding to the three components respectively.

Figure 6A:
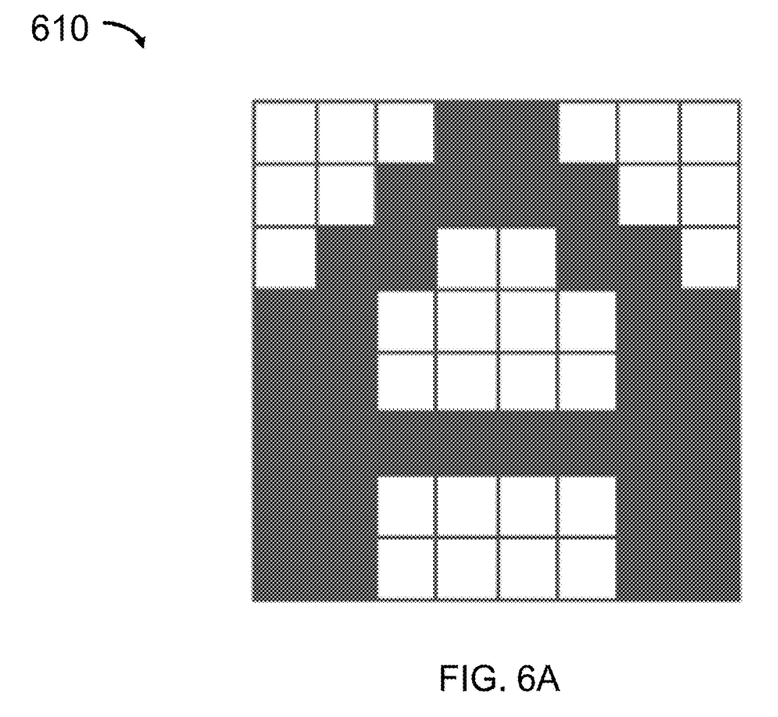
FIG. 6A shows a binary image in accordance with an example embodiment.

FIG. 6A shows a binary image 610 in accordance with an example embodiment.

Figure 6B:
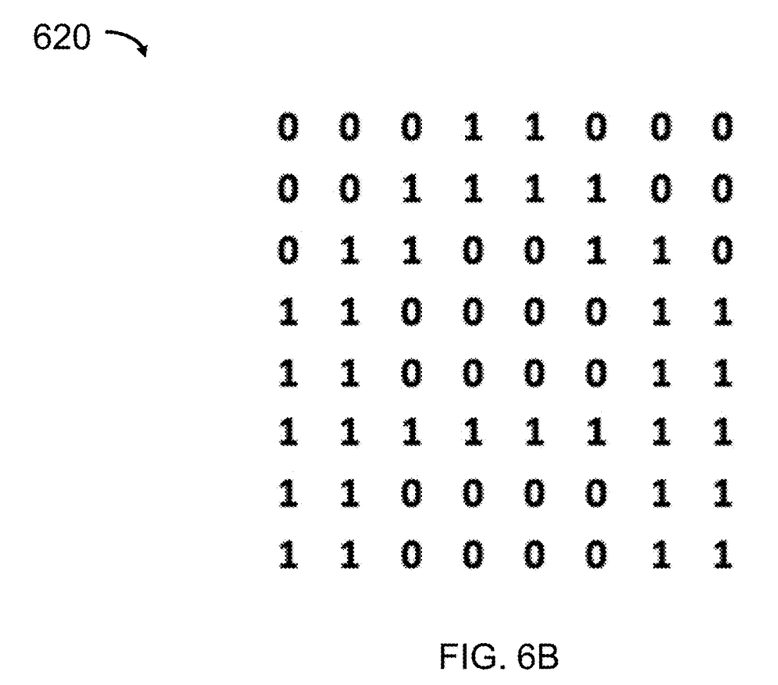
FIG. 6B shows a binary sequence of the binary image of FIG. 6A in accordance with an example embodiment.

FIG. 6B shows a binary sequence 620 of the binary image of FIG. 6A in accordance with an example embodiment.

As shown by FIG. 6A, the binary image 610 includes 8×8 pixels. If the linearization scheme in FIG. 5A is selected, then the binary sequence of the binary image 610 is '00011000 00111100 01100110 11000011 11000011 11111111 11000011 11000011', as shown in FIG. 6B. The binary sequence corresponds to decimal number 1746383746505884611. Based on the algorithm shown in FIG. 4. The decimal number 1746383746505884611 can be further converted to a negative-base number with a genitive base of −10. The negative-base number is '(2354424354506296791)$_{(-10)}$'.

In another example embodiment, the linearization scheme in FIG. 5C is selected. The binary sequence of the binary image 610 is '00011000 0011111 1000011 111100 011110 11111 00001 1111 1001 001 111 00 00 0 0'. The binary sequence corresponds to decimal number 1747132531005690816. Based on the algorithm shown in FIG. 4. The decimal number 1747132531005690816 can be further converted to a negative-base number with a genitive base of −10. The negative-base number is '(2353273549006490996)$_{(-10)}$'.

Figure 7:
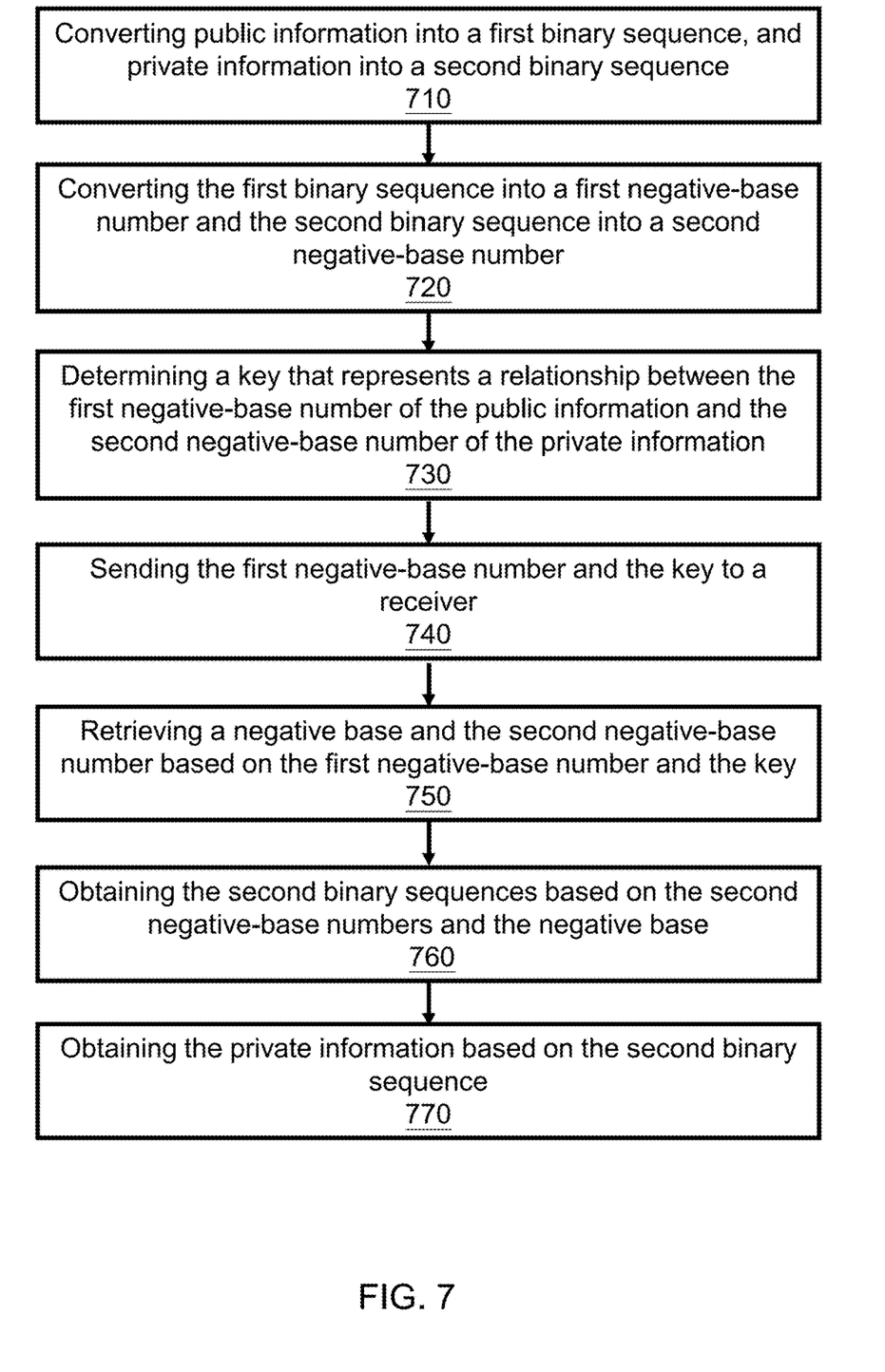
FIG. 7 shows a method executed by a computer system to improve security of private information in accordance with an example embodiment.

FIG. 7 shows a method executed by a computer system to improve security of private information in accordance with an example embodiment.

Block 710 states converting public information into a first binary sequence, and private information into a second binary sequence.

Consider an example in which a computer system includes a binary generator, a negative base generator, a receiver, an encryptor, and a decoder. The computer system transmits public information and private information to a receiver of the computer system. The binary generator converts the public information into a first binary sequence and private information into a second binary sequence. The public and private information can be one or more Chinese characters, one or more English letters, and one or more images. As one example, the public information is a binary image that is divided into a matrix of pixels each corresponding to one or more bits in the first binary sequence.

Block 720 states converting the first binary sequence into a first negative-base number and the second binary sequence into a second negative-base number.

In one example embodiment, the private information is a text that is converted into an American Standard Code for Information Interchange (ASCII). The ASCII is further converted into a binary sequence and further to a decimal number with a base of 10. The decimal number is further converted to a negative-base number with a base of −2, −8, −10 or other negative numbers by a negative base generator, based on a converting algorithm as described in FIG. 4.

Block 730 states determining a key that represents a relationship between the first negative-base number of the public information and the second negative-base number of the private information.

By way of example, the encryptor of the computer system derives or determines a key from the relationship between the negative-base number of the public information and the negative-base number the private information. For example, the key is predetermined by the encryptor of the computer system by a geometric operation between the public information and the private information, and the geometric operation is one of addition, subtraction, multiplication, and division.

Block 740 states sending the first negative-base number and the key to a receiver.

To improve the security of information delivery, the negative-base number of the private information is not transmitted from the sender to the receiver. As one example, the public information is a binary image and the private information is a text. The computer system hides the text from transmitting between the sender and the receiver of the computer system. The key that indicates a relationship between the public information and the private information is transmitted, together with the negative-base number of the public information.

Block 750 states retrieving a negative base and the second negative-base number based on the first negative-base number and the key.

By way of example, the decoder of the computer system calculates the negative-base number based on the first negative-base number and the key. For example, the first negative-base number is 2354424354506296791 and the key is 1956981054550910388827, which is an addition operation of the first and second negative-base numbers. Then second negative-base number is retrieved by the decoder as 1933436811005847742036 by subtracting 2354424354506296791 from 1956981054550910388827.

Block 760 states obtaining the second binary sequences based on the second negative-base numbers and the negative base.

By way of example, the second negative-base number is first converted to a decimal number. A decimal integer N can be written as:

$$N = \sum_{i=0}^{p} n_i(-r)^i \qquad (11)$$

where each digit $n_i$ is a positive integer from 0 to r−1. When the negative-base number $n_p n_{p-1} n_{p-2} \ldots n_1 n_0$ and the value of the negative base b are known, the corresponding decimal number N can be calculated by the decoder of the computer system based on the above equation.

By way of example, the decoder of the computer system stores a look-up table that stores the binary code for each decimal number. For example, the binary code for the decimal number 29410 is 111001011100010.

Block 770 states obtaining the private information based on the second binary sequence.

By way of example, the private information is a text. The decoder of the computer system stores a look-up table that stores a plurality of binary codes each corresponding to a ASCII code, and stores the corresponding text for each ASCII code. For example, the ASCII code for binary sequence '10110000110001001100001111000101

1100110011011000 1100011111111000' is 'B0C4 C3C5 CCD8 C7F8', and the text for the ASCII code is 澳门特区.

The computer system transmits private information based on negative-base numbers. Hence, the process of converting the original information into negative-base numbers is a hiding process. If both the information based on negative base and the selected negative base are known, the original information can be obtained. For example, P represents the public information and S represents the private information. An example hiding process performs the following functions:

1) Function $M(x):x \rightarrow y$ represents the multimedia information to binary sequence;
2) Function $M^{-1}(y):y \rightarrow x$ is the inverse process of $M(x)$;
3) Function $F(y)$ represents the binary sequence to the negative base representation;
4) Function $F^{-1}(y)$ is the inverse process of $F(y)$;
5) Function G is the relationship between two multimedia information.

The hiding process performs the function $M(x)$ for the public information P, then a binary sequence is obtained and noted as $M(P)=y_p$. This binary sequence is converted to a negative-base number $u_1$ by function $F(y_p)$. The same operations are used for the private information S whose negative-base number is $u_2$. By performing a geometric operation between $u_1$ and $u_2$, a key can be obtained. The receiver receives the key and can retrieves the private information based on the key.

Figure 8:
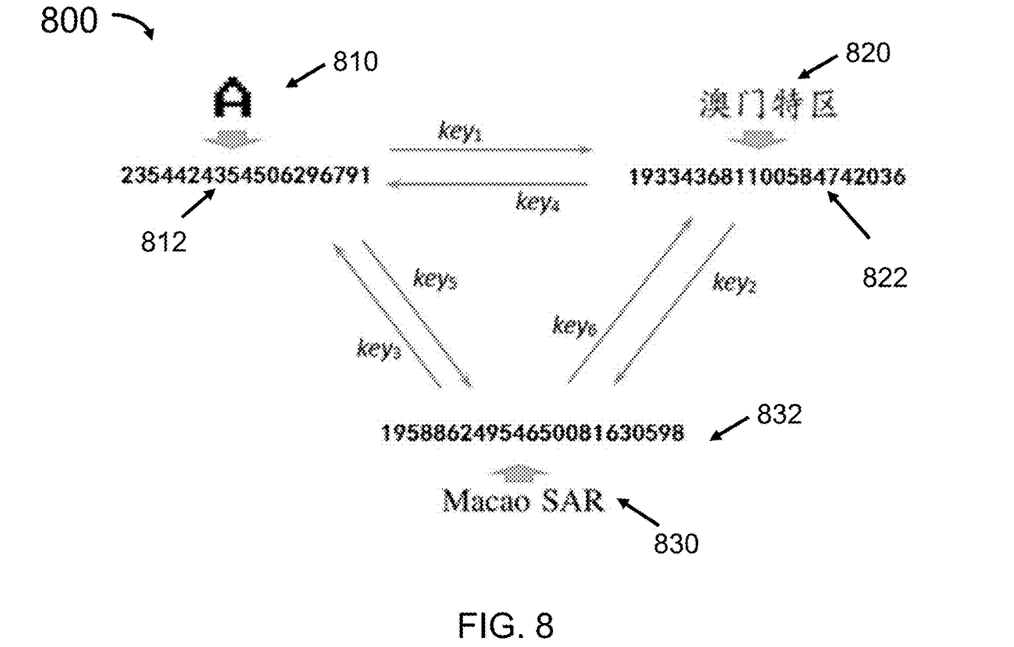
FIG. 8 shows multimedia contents in accordance with an example embodiment.

FIG. 8 shows multimedia contents 800 in accordance with an example embodiment.

In one example embodiment, 810, 820 and 830 are three multimedia contents. 812, 822, 832 are the negative-base numbers with a negative base of −10 for the three multimedia contents 810, 820 and 830, respectively. 810 is a binary image as a public information. 820 and 830 are private information.

By way of example, when the negative base of −10 and the negative-base number 812 of the binary image 810 are known to the decoder of the computer system, 822 can be retrieved based on $key_1$. The private information 820 is then obtained based on 822. Further, the negative-base number 832 of the private information 830 can be obtained based on $key_2$ and 822, or based on $key_5$ and 812.

In one example embodiment, the encryptor of the computer system determines $key_2$ that represents a relationship between the negative-base number 822 of the private information 820 and the negative-base number 832 of the private information 830. The receiver of the computer system receives $key_2$, and the decoder of the computer system retrieves the negative-base number 832 based on $key_2$ and the negative-base number 822. The decoder further obtains a binary sequence that corresponds to the negative-base number 832 and further obtains the private information 830.

Figure 9:
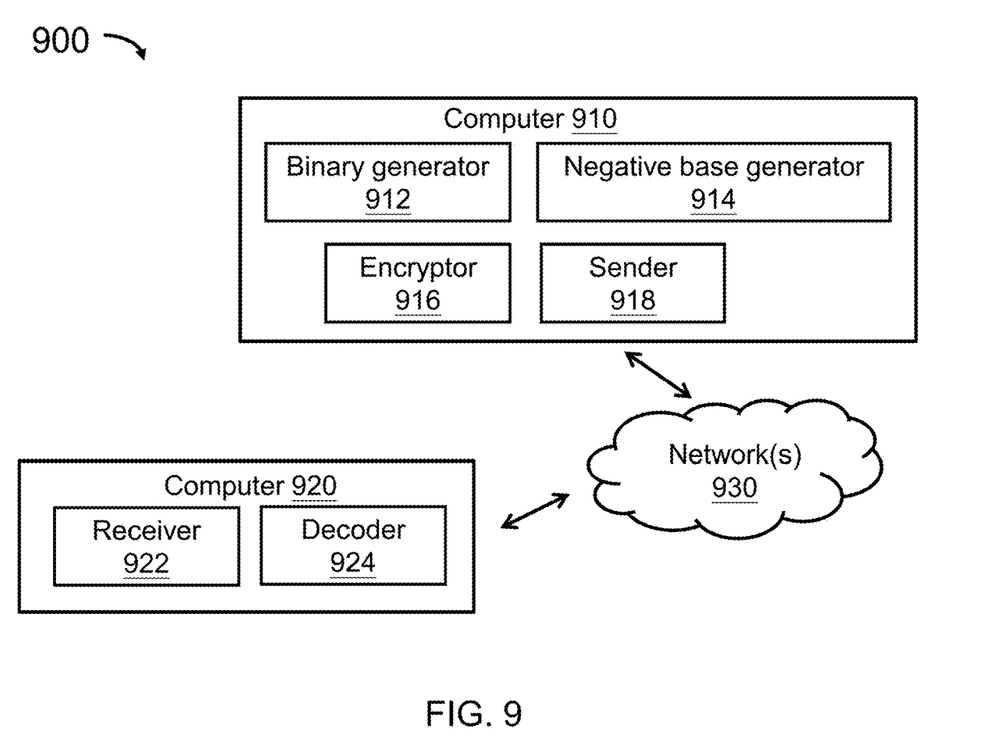
FIG. 9 shows a computer system in accordance with an example embodiment.

FIG. 9 shows a computer system 900 in accordance with an example embodiment.

The computer system 900 includes computer 910, computer 920, and a network 930. Computer 910 includes a binary generator 912, a negative base generator 914, an encryptor 916, and a sender 918. Computer 920 includes a receiver 922 and a decoder 924. One or more elements in the computer system can communicate with each other through one or more networks 930. The computer system 900 securely transmits the private text between the sender and the receiver of the computer system by encrypting a key into the private text.

The networks 930 can include one or more of the internet, an intranet, an extranet, a cellular network, a local area network (LAN), a home area network (HAN), metropolitan area network (MAN), a wide area network (WAN), a Bluetooth network, public and private networks, etc.

In one example embodiment, the computer system transmits a private text through a negative-base system with negative bases. The binary generator 912 converts a binary image and the private text into binary sequences. As one example, the binary image is divided into a matrix of pixels each corresponding to one or more bits in a binary sequence. The private text is represented by an American Standard Code for Information Interchange (ASCII), which can further be converted to a binary sequence.

The negative base generator 914 converts the binary sequences into decimal numbers with a base of 10, and further converts the decimal numbers to negative-base numbers with a base of −2 or −10. For example, the private text is first converted into an American Standard Code for Information Interchange (ASCII). Then the ASCII of the private text is converted into a decimal number. The negative base generator converts the decimal number to a negative-base number based on a converting algorithm as shown in FIG. 4.

The encryptor 916 derives or determines a key that represents a relationship between the negative-base number of the binary image and the negative-base number the private text. As one example, the key is predetermined by the encryptor of the computer system by a geometric operation between the binary image and the private text. The geometric operation is one of addition, subtraction, multiplication, and division. As one example, the encryptor further determines a second key that represents a relationship between the negative-base number of the private text and another negative-base number of another private text.

The sender 918 sends the key and the negative-base number of the binary image to the receiver 922 of the computer system.

The decoder 924 communicates with the receiver 922. The decoder 924 calculates the negative-base number of the private text, based on the key and the first negative-base number. The decoder also retrieves a negative base from the negative base number of the binary image. The negative-base number of the binary image and the negative-base number of the private text have a same negative base. The decoder obtains the binary sequence based on the calculated negative-base number and the negative base, and obtains the private text, based on the binary sequence of the private text.

In one example embodiment, the decoder further retrieves a second negative-base number of a second private text based on a second key that represents a relationship between a first private text and the second private text. Based on the retrieved negative-base number of the second private text, a binary sequence of the second private text is obtained, which further leads to the content of the second private text.

As used herein, a "decimal number" is a mathematical notation that representing numbers with a base of 10 or with a base-ten positional numeral system.

As used herein, a "negative-base number" is a mathematical notation that representing numbers with a negative base.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A method executed by a computer system that improves security of private information, the method comprising:
   converting, by a binary generator of the computer system, public information into a first binary sequence, and the private information into a second binary sequence;
   converting, by a negative base generator of the computer system, the first binary sequence into a first negative-base number and the second binary sequence into a second negative-base number;
   determining, by an encryptor of the computer system, a key that represents a relationship between the first negative-base number of the public information and the second negative-base number of the private information;
   sending, by a sender of the computer system to a receiver of the computer system, the first negative-base number and the key;
   receiving, by the receiver of the computer system, the first negative-base number and the key;
   retrieving, by a decoder of the computer system, a negative base of the first negative base number;
   retrieving, by the decoder of the computer system, the second negative-base number, based on the key and the first negative-base number;
   obtaining, by the decoder of the computer system, the second binary sequence based on the second negative-base number and the negative base; and
   obtaining, by the decoder of the computer system, the private information, based on the second binary sequence,
   wherein the first negative-base number and the second negative-base number have a same negative base.

2. The method of claim 1, wherein the public information is a binary image and the private information is a text, and wherein the computer system hides the text in the transmission between the sender and the receiver of the computer system.

3. The method of claim 1, wherein the public information is a binary image that is divided into a matrix of pixels each corresponding to one or more bits in the first binary sequence.

4. The method of claim 1, wherein the private information is a text that is converted to a negative-base number by:
   converting, by the computer system, the text into an American Standard Code for Information Interchange (ASCII);
   converting, by the computer system, the ASCII of the text into a decimal number; and
   converting, by the computer system and based on a converting algorithm, the decimal number to the negative-base number,
   wherein the negative base of the negative-base number is −10.

5. The method of claim 1, wherein the key is predetermined by the encryptor of the computer system by a geometric operation between the public information and the private information, and the geometric operation is one of addition, subtraction, multiplication, and division.

6. The method of claim 1 further comprising:
   determining, by the encryptor of the computer system, a second key that represents a relationship between the second negative-base number of the private information and a third negative-base number of another private information;
   receiving, by the receiver of the computer system, the second key;
   retrieving, by the decoder of the computer system, the third negative-base number, based on the second key and the first and second negative-base numbers;
   obtaining, by the decoder of the computer system, a third binary sequence based on the third negative-base number and the negative base; and
   obtaining, by the decoder of the computer system, the another private information, based on the third binary sequence.

7. A computer system that transmits a private text through a negative-base system, comprising a first computer, a second computer and a network through which the first computer and the second computer communicate with each other,
   wherein the first computer comprises:
   a binary generator that converts a binary image into a first binary sequence, and the private text into a second binary sequence;
   a negative base generator that converts the first binary sequence into a first negative-base number and the second binary sequence into a second negative-base number;
   an encryptor that determines a key that represents a relationship between the first negative-base number of the binary image and the second negative-base number of the private text; and
   a sender that sends the first negative-base number and the key;
   wherein the second computer comprises:
   a receiver that receives the first negative-base number and the key from the sender; and
   a decoder that communicates with the receiver and that retrieves a negative base of the first negative base number and the second negative-base number based on the key and the first negative-base number, obtains the second binary sequence based on the second negative-base number and the negative base, and obtains the private text, based on the second binary sequence,
   wherein the first negative-base number and the second negative-base number have a same negative base.

8. The computer system of claim 7 securely transmits the private text between the sender and the receiver of the computer system by encrypting the key into the private text.

9. The computer system of claim 7, wherein the binary image is divided into a matrix of pixels each corresponding to one or more bits in the first binary sequence.

10. The computer system of claim 7, wherein the private text is represented by an American Standard Code for Information Interchange (ASCII).

11. The computer system of claim 7, wherein the private text is converted to a negative-base number by:
    converting, by the computer system, the private text into an American Standard Code for Information Interchange (ASCII);
    converting, by the computer system, the ASCII of the private text into a decimal number; and
    converting, by the computer system and based on a converting algorithm, the decimal number to the negative-base number,
    wherein the negative base of the negative-base number is −10.

12. The computer system of claim 7, wherein the key is predetermined by the encryptor of the computer system by a geometric operation between the binary image and the private text, and the geometric operation is one of addition, subtraction, multiplication, and division.

13. The computer system of claim 7, wherein the encryptor further determines a second key that represents a relationship between the second negative-base number of the private text and a third negative-base number of a second private text.

14. The computer system of claim 7, wherein the decoder further retrieves a third negative-base number of a second private text based on a second key that represents a relationship between the private text and the second private text, obtains a third binary sequence of the second private text, and obtains the second private text, based on the third binary sequence.

* * * * *